United States Patent
Livneh et al.

(10) Patent No.: US 12,407,421 B2
(45) Date of Patent: Sep. 2, 2025

(54) SYSTEMS AND METHODS FOR QUANTUM COMMUNICATION

(71) Applicant: QUANT L R LTD., Jerusalem (IL)

(72) Inventors: Nitzan Livneh, Mevasseret Zion (IL); Hagai Shmuel Eisenberg, Jerusalem (IL)

(73) Assignee: QUANT L R LTD., Jerusalem (IL)

( * ) Notice: Subject to any disclaimer, the term of this patent is extended or adjusted under 35 U.S.C. 154(b) by 354 days.

(21) Appl. No.: 18/014,191

(22) PCT Filed: Jul. 2, 2021

(86) PCT No.: PCT/IL2021/050822
§ 371 (c)(1),
(2) Date: Jan. 3, 2023

(87) PCT Pub. No.: WO2022/003704
PCT Pub. Date: Jan. 6, 2022

(65) Prior Publication Data
US 2023/0261761 A1    Aug. 17, 2023

Related U.S. Application Data

(60) Provisional application No. 63/047,521, filed on Jul. 2, 2020.

(51) Int. Cl.
*H04B 10/70* (2013.01)
*H04L 9/08* (2006.01)

(52) U.S. Cl.
CPC ........... *H04B 10/70* (2013.01); *H04L 9/0852* (2013.01)

(58) Field of Classification Search
CPC .............................. H04B 10/70; H04L 9/0852
(Continued)

(56) References Cited

U.S. PATENT DOCUMENTS 10,158,481 B2 * 12/2018 Bunandar ............. H04L 9/0852
11,387,992 B2 *  7/2022 Kikawada ............. H04L 9/0858
(Continued)

FOREIGN PATENT DOCUMENTS

CN       102159984 B   *  3/2013    ........... G02F 1/0121
EP       3629496 A1       4/2020
(Continued)

OTHER PUBLICATIONS

Wang et al; Integrated electronics in 130 nm CMOS process for quantum key distribution sender device; Mar. 2020; AIP publishing, pp. 1-9. (Year: 2020).*

(Continued)

*Primary Examiner* — Amritbir K Sandhu
(74) *Attorney, Agent, or Firm* — CANTOR COLBURN LLP

(57) ABSTRACT

Disclosed a quantum-communication transmitter system comprising a light source configured to generate coherent light, a Mach-Zehnder modulator optically coupled to the light source and configured to simultaneously modulate phase and amplitude of the coherent light generated by said light source, and a driving unit electrically coupled to the Mach-Zehnder modulator and configured to apply electric modulating voltage signals to one single modulating input of the Mach-Zehnder modulator, to thereby cause the Mach-Zehnder modulator to generate phase and amplitude modulated coherent light pulses for implementing a four quantum states time-bin encoding scheme for qubits transmission over a quantum communication channel.

32 Claims, 5 Drawing Sheets

(58) Field of Classification Search
USPC .......................................................... 398/128
See application file for complete search history.

(56) References Cited

U.S. PATENT DOCUMENTS

| | | |
|---|---|---|
| 2016/0352515 A1 | 12/2016 | Bundandar |
| 2017/0237505 A1 | 8/2017 | Lucamarini |
| 2021/0152346 A1* | 5/2021 | Bucklew ................ H04B 10/66 |
| 2023/0254045 A1* | 8/2023 | Yoshino ............... H04B 17/201 |
| | | 398/189 |

FOREIGN PATENT DOCUMENTS

| | | | | |
|---|---|---|---|---|
| JP | 2019148794 A | * | 9/2019 | .............. H04B 10/54 |
| WO | WO-2016099565 A1 | * | 6/2016 | |

OTHER PUBLICATIONS

Li et al; Frequency Chirped Intensity Modulated Mid-Infrared Light Source Based on Optical Parametric Oscillation; Feb. 2020; IEEE Photonics Journal; pp. 1-10. (Year: 2020).*

Janner et al; Waveguide electro-optic modulation in microengineered LiNbO3 ; Mar. 2008; J. Opt. A: Pure Appl. Optics; pp. 1-7. (Year: 2008).*

Goll Bernhard et al: "A 10 GB/s 0.25, [mu]m SiGe modulator driver for photonic-integration", Analog Integrated Circuits and Signal Processing, Springer New York LLC, US, vol. 79, No. 1, Nov. 23, 2013, pp. 15.

International Search Report for corresponding application PCT/IL2021/050822 filed Jul. 2, 2021; Mail date Oct. 11, 2021.

Li Kun et al: "Frequency Chirped Intensity Modulated Mid-Infrared Light Source Based on Optical Parametric Oscillation", IEEE Photonics Journal, IEEE, USA, vol. 12, No. 1, Jan. 10, 2020 pp. 1-9.

Lifante G et al: "Integrated electro-optic Mach-Zehnder modulators based on Zn-diffused LiNbO 3 waveguides", Apr. 1, 2007, pp. 1-4.

Rgr/qkd-003ed2: "Quantum Key Distribution (QKD); Components and Internal Interfaces", Mar. 1, 2018, pp. 1-47.

Urricelqui Javier et al: "Sources of noise in Brillouin optical time-domain analyzers", Proceedings of SPIE, IEEE, US, vol. 9634, Sep. 28, 2015 pp. 963434-963434.

Wang Xinzhe et al: "Integrated electronics in 130 nm CMOS process for quantum key distribution sender device", Review of Scientific Instruments, AIP, Melville, NY, US, vol. 91, No. 3, Mar. 2, 2020.

Written Opinion for corresponding application PCT/IL2021/050822 filed Jul. 2, 2021; Mail date Oct. 11, 2021.

* cited by examiner

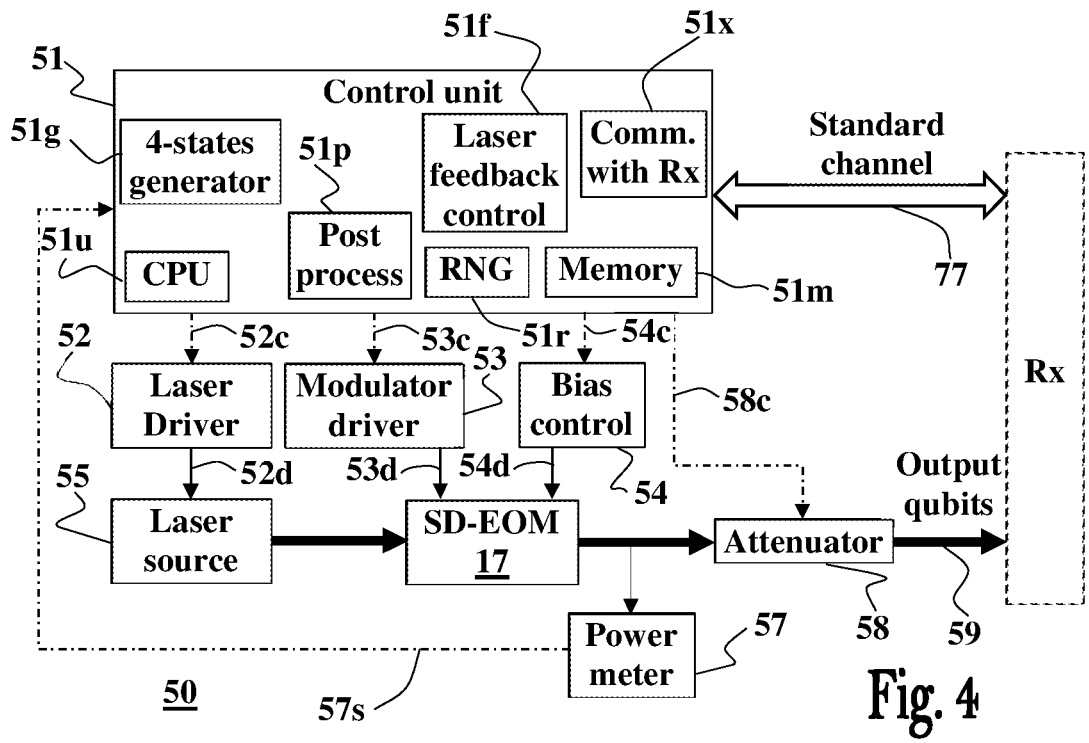
Fig. 4
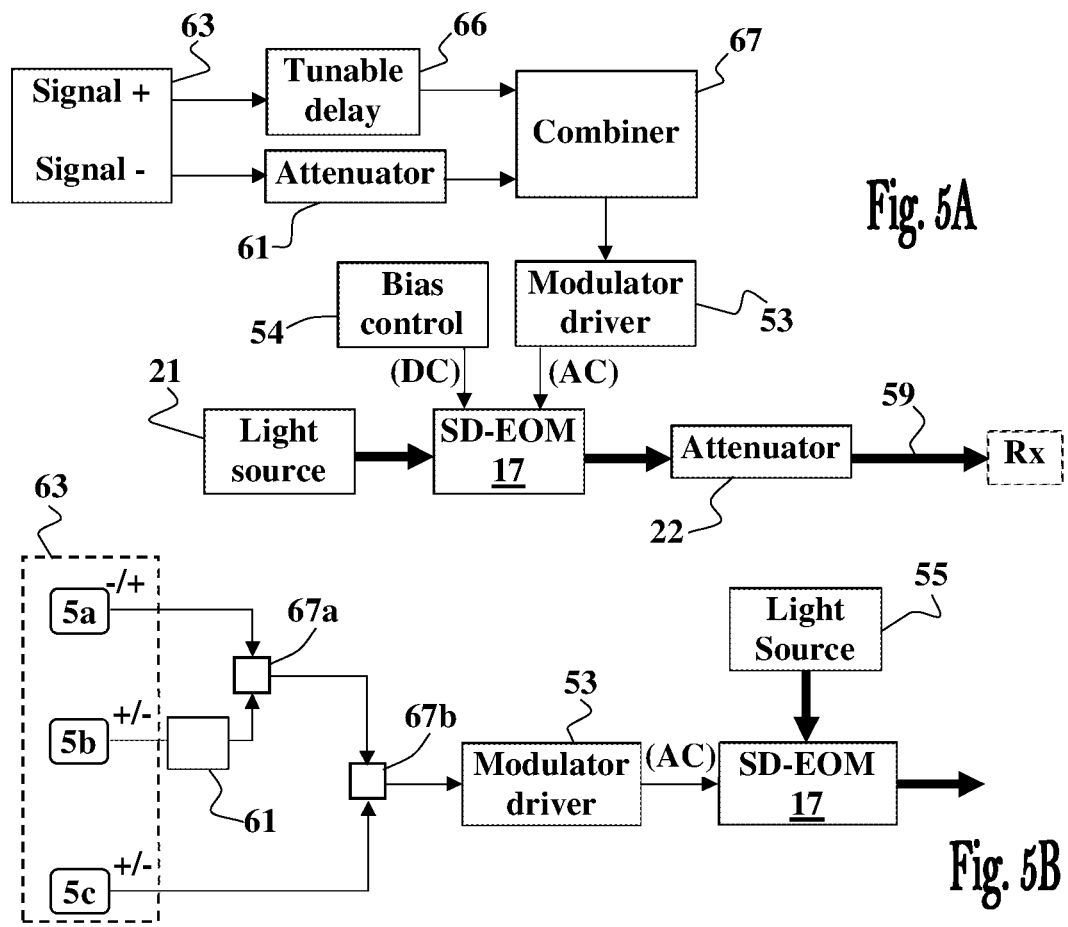
Fig. 5A
Fig. 5B

SYSTEMS AND METHODS FOR QUANTUM COMMUNICATION

TECHNOLOGICAL FIELD

The present invention is generally in the field of optical communication, and particularly concerns quantum communication transmitters usable for quantum key distribution (QKD).

BACKGROUND

This section intends to provide background information concerning the present application, which is not necessarily prior art.

Symmetric encryption methods enable communicating parties to encrypt and decrypt information, as well as to authenticate each other's identity. These symmetric methods usually require a pre-shared cryptographic key, that is used for both encryption and decryption of data.

Quantum communication is currently the most promising communication method that can ensure communication security, as required by military, government, financial, and other such organizations. Quantum key distribution (QKD) is a method for generating and sharing a cryptographic key in a secure way over insecure communication lines. QKD does not require a pre-shared cryptographic key, and it can be used to establish secure communication between parties and guarantee detection of eavesdropping to the communication.

In quantum communication, information is encoded in qubits (quantum bits), having two basis qubit states $|0\rangle$ and $|1\rangle$ or a linear combination (superposition) of these states. For example, quantum information can be encoded in a qubit using single photon polarization techniques. According to the no-cloning theorem, which is the basis for the security of quantum communication schemes, it is impossible to copy information encoded in a qubit without destroying the information originally encoded therein, which thus enables effective detection of eavesdropping attempts.

Time-bin encoding can be used to encode qubit information on photons, wherein information is encapsulated in the relative phase of the transmitted photons. Time-bin encoding is considered very robust against decoherence and useful for quantum communication (e.g., quantum teleportation and quantum key distribution).

Some time-bin quantum communication solutions known from the patent literature are briefly discussed below.

A transmitter for a continuous variable quantum communication system is disclosed in US Patent Publication No. 2017/237505. The transmitter comprises a coherent light source, a first controller, configured to apply a first signal to said coherent light source such that said coherent light source generates coherent light, a phase control element, configured to apply perturbations to said first signal, each perturbation producing a phase shift between parts of the generated coherent light, a first optical component, configured to produce optical intensity modulation, wherein said coherent light source is configured to supply said generated light to said optical component, a second controller, configured to apply a second signal to said optical component such that a light pulse is emitted during a period of time that a first part of the generated light is received, and a light pulse is emitted during a period of time that a second part of the generated light is received, an intensity control element, configured to modulate the amplitude of an emitted light pulse, wherein the phase control element and the intensity control element are configured to encode information in a continuum of values of the phase and amplitude of an emitted light pulse.

US Patent Publication No. 2016352515 describes systems, apparatus, and methods using an integrated photonic chip capable of operating at rates higher than a Gigahertz for quantum key distribution. The system includes two identical transmitter chips and one receiver chip. The transmitter chips encode photonic qubits by modulating phase-randomized attenuated laser light within two early or late time-bins. Each transmitter chip can produce a single-photon pulse either in one of the two time-bins or as a superposition of the two time-bins with or without any phase difference. The pulse modulation is achieved using ring resonators, and the phase difference between the two time-bins is obtained using thermo-optic phase shifters and/or time delay elements. The receiver chip employs either homodyne detection or heterodyne detection to perform Bell measurements.

GENERAL DESCRIPTION

Current commercially available QKD devices are bulky and expensive. A typical QKD system consists of specially designated transmitters and receivers. The current commercial QKD devices use a dual-drive modulator (DDM), an imbalanced Mach Zehnder interferometer (IMZ), or other combinations of intensity and phase optical modulators to generate and distribute a cryptographic key. The present disclosure suggests ways to reduce the costs, the size, and the complexity of the transmitter of a QKD system by using a single drive modulation approach.

Accordingly, in possible embodiments, the transmitter of a QKD system may utilize an off-the-shelf single-drive Mach Zehnder intensity modulator for qubit data modulation. QKD systems implementing the transmitter system embodiments disclosed herein can be used for authentication and securing the communication in a wide variety of networks, ranging from critical infrastructures such as power plants, water plants, transportation management, to finances and national security.

The BB84 protocol is the first and the most common protocol for creating and distributing cryptographic keys based on QKD. It was formulated by Charles Bennet and Gilles Brassard in 1984 and been satisfactorily implemented using many different realizations since then. Its basic ingredients are at least four out of six possible quantum states of a qubit, whose two orthogonal quantum states are the $|0\rangle$ and $|1\rangle$ states. Other quantum states used in QKD implementations are the following linear combinations (superpositions) of the basic orthogonal quantum states $|0\rangle$ and $30|1\rangle$:

$$|p\rangle = \frac{1}{\sqrt{2}}(|0\rangle + |1\rangle)$$

$$|m\rangle = \frac{1}{\sqrt{2}}(|0\rangle + |1\rangle)$$

$$|r\rangle = \frac{1}{\sqrt{2}}(|0\rangle + i|1\rangle)$$

$$|l\rangle = \frac{1}{\sqrt{2}}(i|0\rangle + |1\rangle)$$

A useful physical system for the realization and transmission of qubit is the temporal degree of freedom of a single photon, known as 'Time-bin' encoding. In this system, the transmission of a single photon at a specific time frame encodes the communicated information, when transmitted at no delay to the time frame, i.e., t=0 encodes |0⟩, and transmission at time t=T encodes |1⟩. Thus, the |1⟩ quantum state is also referred to herein as a |τ⟩ state, in the context of time-bin encoding. The other four states are defined accordingly as superpositions of the amplitudes for single photon detection at each of these time frames.

In order to realize the BB84 protocol, a transmitter requires the capability to generate at least two out of the three orthogonal bases as defined in the equations above: 0/1, p/m and r/l. The communication can be carried out by modulating a continuous wave laser diode with a coherence time considerably longer than τ i.e., the time interval of the time frame, and shape it into well separated pulses, so that the probability to measure the photon arrival time τ when transmitted in time 0 is very low (e.g., below 1%). The modulated laser pulses are then attenuated to a level such that intensity of each modulated laser pulse contains on average less than a single photon. For example, with a frame rate of 1 GHz and photon wavelength of 1.55 μm and 0.1 photon per frame on average, the laser power will be attenuated to about $1.28*10^{-11}$ watts (−78.9 dBm). Although the photon statistical distribution is Poissonian due to the coherent state of the laser, such a configuration of attenuated coherent states is sufficient for QKD.

It is desirable for quantum communication systems to have a compact optical amplitude modulator with low power requirements. A promising candidate for such a device is the integrated Mach-Zehnder electro-optic Modulator (MZ-EOM). FIG. 1A schematically illustrates a dual-drive MZ-EOM device 10 comprising a single input dielectric waveguide 11, a first coupler/splitter 11s for splitting the power of the injected optical signal e.g., continuous-wave (CW) laser input, evenly between two parallel waveguides, Arm a and Arm b, a second coupler 12s for recombining the optical signals propagating through the Arm a and Arm b waveguides back into a single output waveguide 12. When the two waveguide arms, Arm a and Arm b, are completely symmetric, substantially all of the optical energy of the input optical signal is merged at the recombination coupler 12s. If, however, the phase of the optical signal in one of the arms, Arm a or Arm b, is changed relative to the phase of the optical signal in the other arm, power oscillations occur at the output waveguide 12, as a function of the relative phase between the waveguide arms, due to interference.

In the dual-drive MZ-EOM device 10, two electrodes, $\theta_{a/b}$ and $\varphi_{a/b}$, are incorporated in each of the waveguide arms, Arm a or Arm b, in order to control the relative phase between waveguide arms, thus controlling the output amplitude and the total phase of the optical wave signal transmitted through the output waveguide 12. The dual-drive MZ-EOM 10 utilizes phase control drivers, PCa and PCb, for each of its waveguide arms; the PCa driver for generating the Bias a (DC) and Signal a (AC) signals for the respective electrodes $\theta_a$ and $\varphi_a$ of Arm a, and the PCb driver for generating the Bias b (DC) and Signal b (AC) signals for the respective electrodes $\theta_b$ and $\varphi_b$ of Arm b.

The DC biasing electrode is used to set the working point of the waveguide arm, e.g., π phase shift between both arms, so that the modulator absorbs the light and the output port is dark. The AC signaling electrode adds phase to the phase caused by the applied DC bias, for high bandwidth changes in the modulator output, i.e., for optical pulse generation.

An advantage of the dual-drive MZ-EOM device 10 is that any transmittance ratio of the device can have any absolute phase, per design considerations. Without such full control over the absolute phase, residual unwanted phase imposed during the amplitude modulation process results with a broadening of the signal bandwidth, that can limit the speed of high bit rate communication.

FIG. 1B schematically illustrates a single-drive MZ-EOM device 17 comprising only one active phase waveguide channel provided in one of the interferometer arms, Arm a.

Accordingly, the single-drive MZ-EOM device 17 utilizes a single phase control driver; PCa for generating the Bias a (DC) and Signal a (AC) signals for the respective electrodes $\theta_a$ and $\varphi_a$ of Arm a only. Among the challenges of using a single-drive MZ-EOM are that there is a fixed relation between the transmittance ratio of the device 17 and the phase of the optical signal thereby output (see FIG. 1C). For many uses this phase is unwanted. However, by precise driving of the single-drive MZ-EOM device 17 that sets the right phase and amplitude to each quantum state, this fixed relation can be used in the BB84 implementation utilizing embodiments of the quantum transmitter system disclosed herein.

When using the dual-drive MZ-EOM device 10, the application of voltage signals to the electrodes ($\theta_a$, $\varphi_a$) and ($\theta_b$, $\varphi_b$) of both arms, correspondingly changes the refractive index of the respective waveguide arms, which affects the phase of the optical signal each waveguide arm guides in a linear manner. The biasing electrodes $\theta_a$ and $\theta_b$ of the dual-drive MZ-EOM device 10 are configured to apply slowly varying, Bias a and Bias b, voltage signals, which are used to bias the dual-drive MZ-EOM device 10 to a zero-AC voltage working point thereof. The applied Bias a and Bias b voltage signals are used to correct for manufacturing imperfections, thermal variations and/or to set the no AC voltage point to a normally closed point, a normally opened point, a middle point of the linear response region of the device (quadrature), or any other desired working point. The Bias a and Bias b voltage signals are thus generally referred to herein as direct-current (DC) signals, though they are not necessarily DC signals i.e., they can be slowly varying voltage signals.

The two other electrodes, $\varphi_a$ and $\varphi_b$, typically have a very fast frequency response, and modulate the phase shift in each arm of the modulator as a function of electrode voltage Signal a and Signal b. The constructive or destructive interference of the optical signals in the two arms at the output optical combiner 12s results in a carrying output signal intensity. The Signal a and Signal b voltage signals are thus referred to herein as alternating-current (AC) signals. The Signal a/Signal b voltage signal required to completely switch the EOM output between the fully 'OFF' (zero transmittance) and the 'ON' (full transmittance) states is referred to herein as $V_\pi$.

Assuming that the biasing voltages, Bias a and Bias b, are set such that when there is no modulating voltage signal (i.e., Signal a=Signal b=0 Volts) the dual-drive MZ-EOM device 10 is at its 'OFF' state, the electrical field response to the two modulating signal voltages can be expressed as follows:

$$E_{out} = E_{in} \sin\left(\frac{\varphi_a - \varphi_b}{2}\right) \exp\left(i\frac{\varphi_a + \varphi_b}{2}\right) \quad (1)$$

wherein $E_{out}$ is the electrical field strength of the output optical signal, $E_{in}$ is the electrical field strength of the input optical signal, $\varphi_a$ is the relative phase shift of the optical signal passing through Arm a due to the Signal a modulating voltage signal, and $\varphi_b$ is the relative phase shift of the optical signal passing through Arm b due to the Signal b modulating voltage signal.

Although it is possible to modulate the amplitude of the optical signal with only one fast modulating voltage signal, Signal a or Signal b, such approach imposes a residual overall phase shift. Thus, a push-pull configuration is preferred, wherein $\varphi_a = -\varphi_b$, such that the overall phase term is cancelled. Otherwise i.e., if $\varphi_a \neq -\varphi_b$, there is an overall phase affecting the electric field of the outputted optical signal, said overall phase is about half of the phase difference applied by the electrodes due to the fast modulating signals, Signal a and Signal b.

The $|0\rangle$ and $|1\rangle$ states can be encoded directly by the time of turning the modulator to its "ON" state. The other four (4) quantum states require the generation of superposition of time-bins. One option is to use an imbalanced Mach-Zehnder (IMZ) fiber interferometer, whose arm's length difference generates a temporal time delay of τ seconds. In addition to the IMZ, it is required to switch the relative phase between the arms of the IMZ with a fast phase modulator (PM) in order to generate both the $|p\rangle$ and the $|m\rangle$ states. Switching between the 0/1 and the p/m bases may be accomplished by using another intensity EOM. This modulator can be omitted if instead of the 0/1 base, the r/l base is used. Thus, the PM in the IMZ should apply four different phases, 0 and π for the p/m states, and ±π/2 for the r/l states. Such an approach complicates the design of the receiver side, as it requires another fast PM in the receiver's IMZ, or two IMZ units multiplexed through a balanced coupler and four (4) single photon detectors.

In possible embodiments, the IMZ at the transmitter can be dropped out altogether by applying the qubit phases with the pulse generating EOM (e.g., MZ-EOM) itself i.e., the residual phase shift of the EOM can be used to generate the quantum states required for QKD protocol. Table 1 presents a possible realization for the phases and their timing for each of the six QKD quantum states. As the overall phase of a photon does not actually matter in time-bin encoding, because only the relative phase between its two temporal amplitudes during the qubit frame, it is possible to add a constant phase to all of the generated phase states i.e., a same constant can be added to each line in Table 1, without changing the overall result. It is noted that in the realization presented in Table 1 there are seven (7) different phase values that have to be applied by the dual-drive MZ-EOM device 10. There is no obvious way to null the phases of one of the two electrodes for at least two of the bases. Succeeding in this task will enable the use of a modulator with a single modulating element.

TABLE 1 phases for generating six BB84 time-bin states by the dual-drive MZ-EOM.

|  | t = 0 | | t = τ | |
| --- | --- | --- | --- | --- |
|  | $\varphi_a$ | $\varphi_b$ | $\varphi_a$ | $\varphi_b$ |
| $|0\rangle$ | π/2 | −π/2 | 0 | 0 |
| $|1\rangle$ | 0 | 0 | π/2 | −π/2 |
| $|p\rangle$ | π/4 | −π/4 | π/4 | −π/4 |
| $|m\rangle$ | π/4 | −π/4 | 5π/4 | 3π/4 |
| $|r\rangle$ | π/4 | −π/4 | 3π/4 | π/4 |
| $|l\rangle$ | π/4 | −π/4 | π/4 | 3π/4 |

In possible embodiments, in order to keep the photon number probability uniform for the pure (single time, $|0\rangle$ or $|1\rangle$ ) quantum states and the superposition quantum states, the intensity level for each of the superposition time bins should be set to half of the intensity of the single time bin of the pure quantum states. Thus, the phase difference for the $|0\rangle$ and $|1\rangle$ quantum states is π while for the other states it is π/2.

The present application provides method and system for quantum key distribution (QKD) utilizing a single-drive electro-optic-modulator (SD-EOM, also known as intensity modulator e.g., single-drive Mach Zehnder intensity modulator) to modulate phase and amplitude of light photons and realize the QKD protocol (e.g., BB84 or SARG) utilizing four (4) different combined phase-amplitude modulation states for time-bin encoding. In embodiments disclosed herein, the SD-EOM is used to simultaneously modulate both the amplitude and the phase of the transmitted optical (e.g., laser) signals, for generating time-bin qubits (one or two pulses) in four (4) quantum states, by applying different AC voltage signal levels, in different time frames, to the modulating electrode of the SD-EOM.

A quantum communication transmitter (Tx) according to some embodiments comprises a light source e.g., continuous wave (CW) laser diode, a single-drive electro-optic-modulator (SD-OEM), a modulator driver configured to apply a biasing DC signal and a modulating AC signal to the electrodes of the SD-EOM for generating modulated pulses of light photons from the light source, and an attenuator for attenuating each modulated light pulse from the SD-EOM to an average level smaller than that of a single photon. The attenuated modulated light pulses are transmitted over a quantum channel e.g., optical fiber or free space medium, towards a respective quantum communication receiver (Rx), that can be implemented using conventional quantum communication receiver equipment, as known in the art.

Accordingly, some of the embodiments disclosed herein are directed to a quantum key distribution transmitter that utilizes a single drive modulator, as disclosed hereinabove and/or hereinbelow. A communication system can be accordingly constructed to include a plurality of the quantum key distribution transmitters, that use a single drive modulator, according to any one of the embodiments disclosed hereinabove and/or hereinbelow. As also disclosed herein, suitable methods for generating and distributing cryptographic keys using the embodiments of the quantum key distribution transmitter disclosed herein, are accordingly devised. In some embodiments, quantum communication systems implemented in accordance with the embodiments disclosed herein can be adapted to encrypt more than Tbps of information.

One inventive aspect of the subject matter disclosed herein relates to a quantum-communication transmitter system comprising a light source configured to generate coherent light, a Mach-Zehnder modulator optically coupled to the light source and configured to simultaneously modulate phase and amplitude of the coherent light generated by the light source, and a driving unit electrically coupled to the Mach-Zehnder modulator and configured to apply electric modulating voltage signals to one single modulating input driving the Mach-Zehnder modulator, to thereby cause the Mach-Zehnder modulator to generate phase and amplitude modulated coherent light pulses for implementing a four quantum states time-bin encoding scheme for qubits transmission over a quantum communication channel.

Optionally, but in some embodiments preferably, the system comprises an attenuator unit configured to attenuate the phase and amplitude modulated coherent light pulses generated by the Mach-Zehnder modulator before the transmission over the quantum communication channel. The driving unit can be further configured to apply electric biasing voltage signals to other one single input of the Mach-Zehnder modulator.

The driving unit can be configured to generate the electric modulating voltage signals from first and second data signals received from respective first and second transceiver units, wherein polarity of one of said data signals is opposite to polarity of the other data signal. Optionally, but in some embodiments preferably, the driving unit comprises at least one voltage adjustment unit configured to adjust voltage of at least one of said first or second data signals to attain an amplitude ratio therebetween for encoding the time-bin quantum state encoding, a combiner unit configured to combine the data signals having the attained amplitude ratio therebetween; and a driving unit configured to control the electric modulating voltage signals applied over the modulating electrode based on the combined signal from said combiner unit. In possible embodiments the driving unit further comprises at least one signal synchronizing element for synchronizing the first and second data signals in time. For example, the driving unit can comprises a tuneable delay unit configured to controllably apply a time delay to the first data signal, an internal attenuator or voltage adjustment unit (e.g., a signal regenerator with tuneable amplitude or an amplifier) configured to attenuate the second data signal, a combiner unit configured to combine the time delayed signal from the tuneable delay unit and the attenuated/adjusted signal from the internal attenuator or voltage adjustment unit, and a driving unit configured to control the electric modulating voltage signals applied over the modulating electrode based on the combined signal from the combiner unit.

In some embodiments the driving unit is configured to generate the electric modulating voltage signals from first, second and third, data signals received from respective first, second and third, transceiver units, wherein polarity of the first data signal is opposite to the polarity of the other data signals. Optionally, but in some embodiments preferably, the driving unit comprises at least one voltage adjustment unit configured to adjust voltage level of at least one of the first, second or third, data signals to attain an amplitude ratio therebetween for encoding the time-bin quantum state encoding, at least one combiner unit configured to combine the data signals having the attained amplitude ratio therebetween, and a driving unit configured to control the electric modulating voltage signals applied over the modulating electrode based on the combined signal from said at least one combiner unit. In some embodiments the driving unit further comprises at least one signal synchronizing element for synchronizing the first, second and third, data signals in time. For example, the driving unit may comprise an internal attenuator or voltage adjustment unit (e.g., signal regenerator with tuneable amplitude or an amplifier) configured to attenuate the second data signal, a first combiner unit configured to combine the first data signal and the attenuated/adjusted signal from the internal attenuator or voltage adjustment unit, a second combiner unit configured to combine the combined signal from the first combiner unit with the third data signal, and a driving unit configured to control the electric modulating voltage signals applied over the modulating electrode based on the combined signal from the second combiner unit.

The Mach-Zehnder modulator can be a single drive modulator. Alternatively, the Mach-Zehnder modulator is a type of X-cut or Z-cut single drive modulator. In some embodiments the four quantum states of the time-bin encoding scheme utilizes p/m and r/l quantum state bases.

The driving unit is configured in some embodiments to encode at least one of the quantum states of the time-bin encoding scheme by amplitude and phase modulation of two consecutive coherent light pulses.

In some embodiments a control unit is used to operate components of said system for carrying out a QKD protocol (BB84 or SARG). The control unit can be configured and operable to generate control signals for operating at least one of the light sources, the Mach-Zehnder modulator, and the attenuator unit. A power meter unit optically coupled to an output of the Mach-Zehnder modulator can be used to measure power of the modulated coherent light pulses thereby generated, and generate measurement data indicative thereof. Optionally, the control unit is configured to generate the control signal at least partially based on the generate measurement generated by said power metre.

Another inventive aspect disclosed herein relates to a quantum-communication transmission method comprising: generating coherent light; and simultaneously modulating phase and amplitude of the coherent light by applying electric modulating voltage signals to one single modulating input of a Mach-Zehnder modulator, to thereby cause the Mach-Zehnder modulator to generate phase and amplitude modulated coherent light pulses for implementing a four quantum states time-bin encoding scheme for qubits transmission over a quantum communication channel. The method may comprise attenuating the phase and amplitude modulated coherent light pulses generated by the Mach-Zehnder modulator before the transmission over the quantum communication channel.

The method comprises in some embodiments applying electric biasing voltage signals to other one single input of the Mach-Zehnder modulator.

In some embodiments the method comprises generating the electric modulating voltage signals from first and second data signals, wherein one of said data signals is an inverse of the other data signal. Optionally, but in some embodiments preferably, the method comprising adjusting voltage of at least one of the first and second data signals to attain an amplitude ratio therebetween for encoding the time-bin quantum states, combining the data signals at the attained amplitude ratio, and controlling the electric modulating voltage signals applied over the modulating electrode based on the combined signal obtained. The method may comprise synchronizing in time the first and second data signals before or after the adjusting of their voltages. For example, the method may comprise applying a time delay to the first data signal, attenuating voltage of the second data signal, combining the time delayed first data signal with the voltage attenuated second data signal; and controlling the electric modulating voltage signals applied over the modulating electrode based on the combined signal obtained.

In some embodiments the method comprises generating the electric modulating voltage signals from first, second and third, data signals, wherein polarity of the first data signal is opposite to the polarity of the other data signals. Optionally, but in some embodiments preferably, the method comprising adjusting voltage of at least one of the first, second and third, data signals to attain an amplitude ratio therebetween for encoding the time-bin quantum states, combining the data signals at the attained amplitude ratio, and controlling the electric modulating voltage signals applied over the modulating electrode based on the second combined signal. The method may comprise synchronizing in time the first, second and third, data signals before or after the adjusting of their voltages. For example, the method may comprise attenuating voltage of the second data signal, generating a first combined signal by combining the first data signal and the voltage attenuated signal, generating a second combined signal by combining the first combined signal with the third data signal, and controlling the electric modulating voltage signals applied over the modulating electrode based on the second combined signal.

In some embodiment the implementing of the four quantum states time-bin encoding scheme comprises using p/m and r/l quantum state bases for the encoding. The method can be adapted for carrying out a QKD protocol utilizing the quantum-communication transmission method disclosed herein.

The method may comprise encoding at least one of the quantum states of the time-bin encoding scheme by amplitude and phase modulation of two consecutive coherent light pulses.

Optionally, the method comprises measuring a power of the modulated coherent light pulses for generating measurement data indicative thereof, and controlling operation of the coherent light source at least partially based on the said measurement data.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 1A to 1C schematically illustrate use of dual-drive and single-drive electro-optic modulators according to possible embodiments, wherein FIG. 1A shows a dual-drive electro-optic modulator, FIG. 1B shows a single-drive electro-optic modulator, and FIG. 1C shows optical phase of the single-drive electro-optic modulator of FIG. 1B;

FIGS. 2A and 2B schematically illustrate a transmitter system according to some possible embodiments, wherein FIG. 2A is a block diagram of the transmitter system and FIG. 2B is a is a block diagram of possible components of the driver unit of the transmitter system;

FIGS. 3A to 3C schematically illustrates a transmitter system according to some other possible embodiments, wherein FIG. 3A shows a possible quantum transmitter system, and FIGS. 3B and 3C show graph plots schematically illustrating output transmittance and phase shift, respectively, of the single-drive electro-optic modulator;

FIG. 4 schematically illustrates a communication system according to some possible embodiments;

FIGS. 5A and 5B schematically illustrate a transmitter system according to yet other possible embodiments, wherein FIG. 5A exemplifies use of two (2) synchronized transceivers for generation of the modulation signals and FIG. 5B exemplifies use of three synchronized transceivers for generation of the modulation signals.

DETAILED DESCRIPTION OF EMBODIMENTS

Figure 1A:
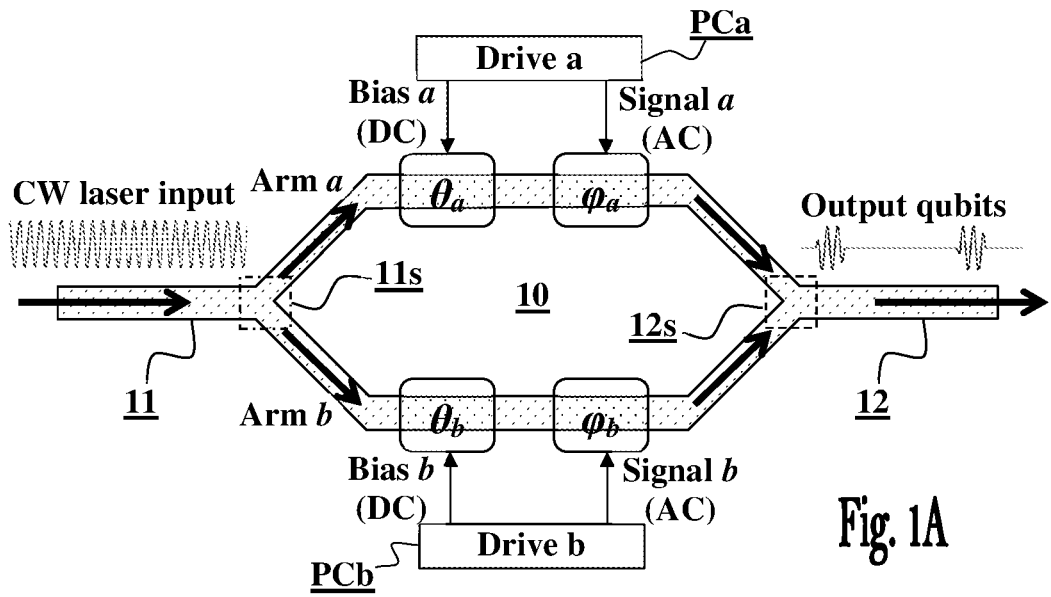

One or more specific and/or alternative embodiments of the present disclosure will be described below with reference to the drawings, which are to be considered in all aspects as illustrative only and not restrictive in any manner. It shall be apparent to one skilled in the art that these embodiments may be practiced without such specific details. In an effort to provide a concise description of these embodiments, not all features or details of an actual implementation are described at length in this specification. Elements illustrated in the drawings are not necessarily to scale, or in correct proportional relationships, which are not critical. Emphasis instead being placed upon clearly illustrating the principles of the invention such that persons skilled in the art will be able to make and use the transmitter/communication systems, once they understand the principles of the subject matter disclosed herein. This invention may be provided in other specific forms and embodiments without departing from the essential characteristics described herein.

The present disclosure provides techniques for implementing QKD protocols (e.g., BB84 or SARG) using only one pair of inputs (DC and AC electrodes) of an electro-optic modulator (EOM). Accordingly, embodiments disclosed herein can be implemented utilizing a single-drive MZ modulator (generally referred to herein as SD-EOM) configured to simultaneously modulate phase and amplitude for single photon time-bin encoding. The QKD protocol can be implemented this way utilizing four different combined phase-amplitude modulation states configured to generate four (4) time-bin photon encoding states. Use of the SD-EOM in the embodiments disclosed herein is exploited, inter alia, to reduce the cost, size and operation complexity, of quantum communication systems, as a simpler pattern synthesizer and only one driving amplifier are required for the operation of an SD-EOM.

For an overview of several example features, process stages, and principles of the present disclosure, the examples of quantum communication transmitters illustrated schematically and diagrammatically in the figures are intended for QKD applications. These quantum communication transmitters are shown as one example implementation that demonstrates a number of features, processes, and principles used to implement QKD protocols, but they are also useful for other applications (e.g., quantum data communication) and can be made in different variations. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in quantum communication applications may be suitably employed, and are intended to fall within the scope of this disclosure.

Figure 2A:
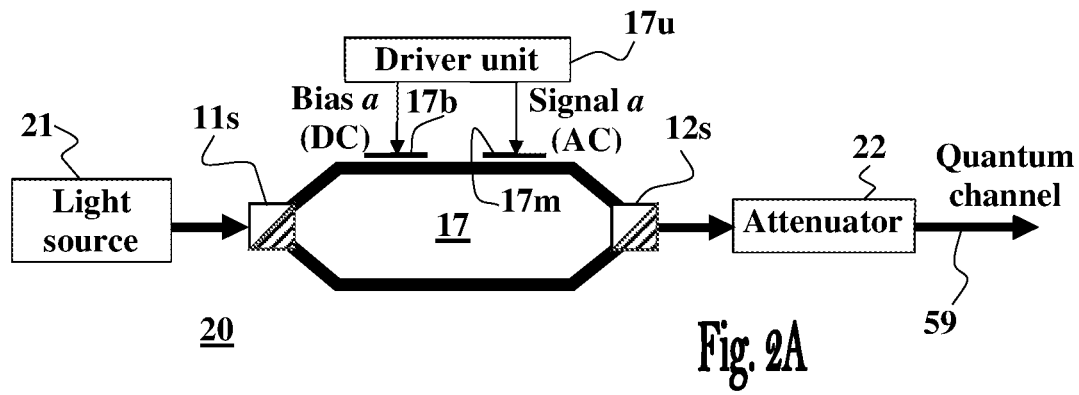

FIG. 2A schematically illustrates a quantum communication transmitter 20 according to some possible embodiments. The quantum communication transmitter 20 comprises a light source (e.g., continuous-wave laser) 21, a SD-EOM 17 (e.g., single-drive MZ-EOM) optically coupled to the output light source 21, a driver unit 17u electrically coupled to biasing and modulating electrodes, 17b and 17m, of the SD-EOM 17, an attenuator unit 22 connected to the output of the SD-EOM 17, and a quantum communication channel 59 (e.g., optical fiber or free-space medium) optically coupled to the output of the attenuator 22. The light source 21 is configured to generate coherent light. In some embodiments the coherence must be lost between qubits utilizing state of the art coherence control means e.g., utilizing gain switched laser.

The SD-EOM 17 is configured to modulate the coherent light generated by the light source 21. The driver unit 17u is configured to generate the Bias a (DC) and Signal a (AC) voltage signals for respectively biasing the SD-EOM 17 and generating phase and amplitude simultaneously modulated light pulses from the coherent light generated by the light source 21. The attenuator unit 22 is configured to attenuate each of the modulated light pulses generated by the SD-EOM 17 to single photon communication intensity level.

Operation of the SD-EOM 17 according to possible embodiments may use the 0/1 and the p/m quantum state bases by combined phase-amplitude photon modulation. These two bases are sufficient for realizing a QKD protocol, such as the BB84 or SARG protocol. In some embodiments, the communication system embodiments disclosed herein utilize the freedom in the overall phase described above, plus an additional symmetry of the Sine modulation term of the SD-EOM. The modulating voltage, and modulated amplitude-phase values, for a possible realization of a BB84 (or SARG) protocol with the SD-EOM are listed in Table 2 and Table 3 below. For this realization only four (4) phase modulation values are required. In other possible embodiments, the basis p/m can also be generated with SD-EOM by doubling the phases used for the r/l states, but with double probability for transmitting a photon. This may have a negative result for QKD as it biases the even randomness required for the protocol. Nevertheless, it can prove to be useful when implementing an additional decoy state protocol that is used to better prevent 'photon number splitting' attacks on the system.

Accordingly, in some embodiments the transmitter/QKD systems disclosed herein are adapted to introduce decoy qubits for protection against QKD attached, such as the photon number splitting attacks.

Figure 2B:
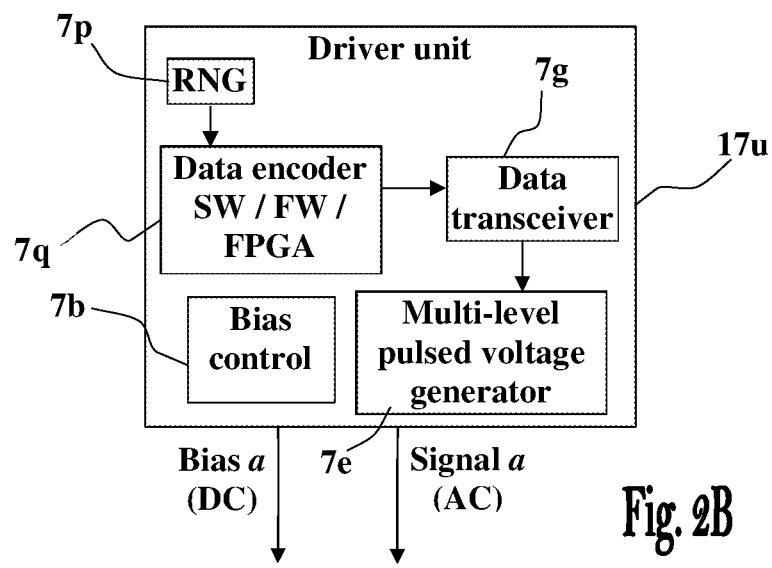

FIG. 2B schematically illustrates components of a drive unit 17u, according to some possible embodiments. In this specific and non-liming example the driving unit 17u comprises a bias control unit 7b, a random number generator (RNG) 7p, a data transceiver 7g, a data encoder 7q, and a multi-level pulse voltage generator 7e. The bias control module 7b is configured to generate control signals for adjusting the Bias a signals generated by the DC signal generator 7d for driving the AC electrode of the SD-EOM.

The data encoder is configured to receive a stream of data, which may be generated by the RNG 7p to encode the required quantum states to be modulated. The encoded data from the data encoder 7q is fed to the one or more data transceivers 7g configured to generate an electrical serial digital data stream driving the multi-level pulsed voltage generator for generation 7e of the modulating (AC) signals. The driver unit 17u can be configured to implement the phase and amplitude modulation states presented in Tables 2 to 5.

The AC voltage levels applied to the modulating electrode of the SD-EOM are proportional to the voltage levels indicated in Table 2 (where $V_\pi$ is the voltage level for setting the SD-EOM into a full transmission state).

TABLE 2

Figure 1B:
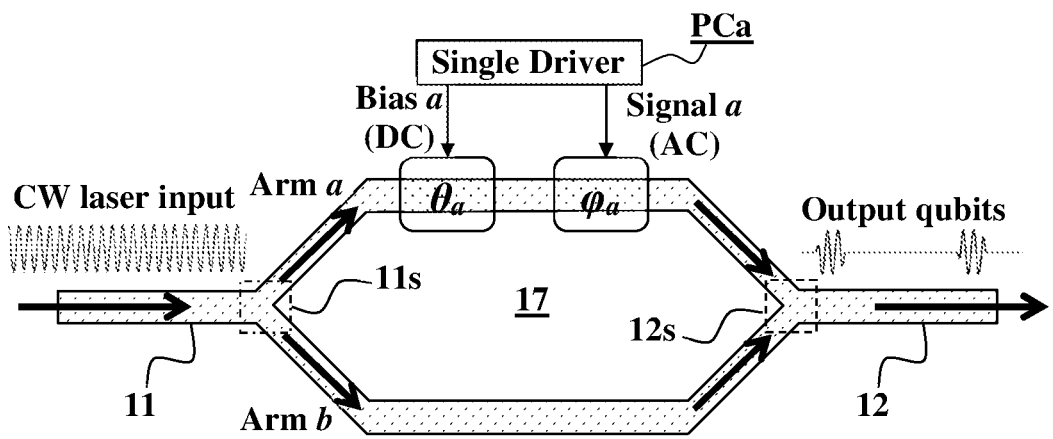

SD-EOM modulation voltages for time-bin photon state encoding using unit 17 of FIGS. 1B and 2A.

| | t = 0 | t = τ |
|---|---|---|
| |0⟩ | $V_\pi$ | 0 |
| |1⟩ | 0 | $V_\pi$ |
| |p⟩ | $V_\pi/2$ | $V_\pi/2$ |
| |m⟩ | $V_\pi/2$ | $-V_\pi/2$ |

TABLE 3 optical modulation amplitude and phase for time-bin photon state encoding by the SD-EOM using unit 17 of FIGS. 1B and 2A.

| | t = 0 | t = τ |
|---|---|---|
| |0⟩ | A = $A_0$, φ = 0 | A = 0, φ = 0 |
| |1⟩ | A = 0, φ = 0 | A = $A_0$, φ = 0 |
| |p⟩ | A = $A_0/2$, φ = 0 | A = $A_0/2$, φ = 0 |
| |m⟩ | A = $A_0/2$, φ = 0 | A = $A_0/2$, φ = π |

Figure 3A:
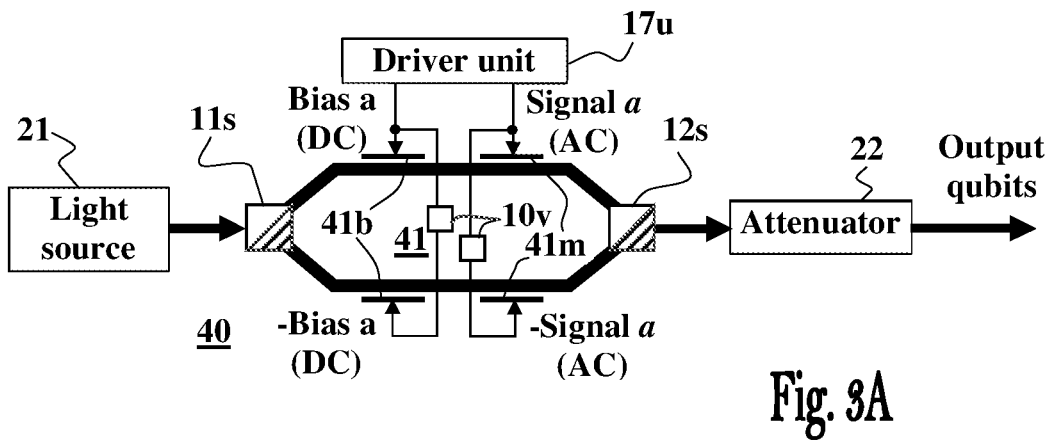
Figure 3B:
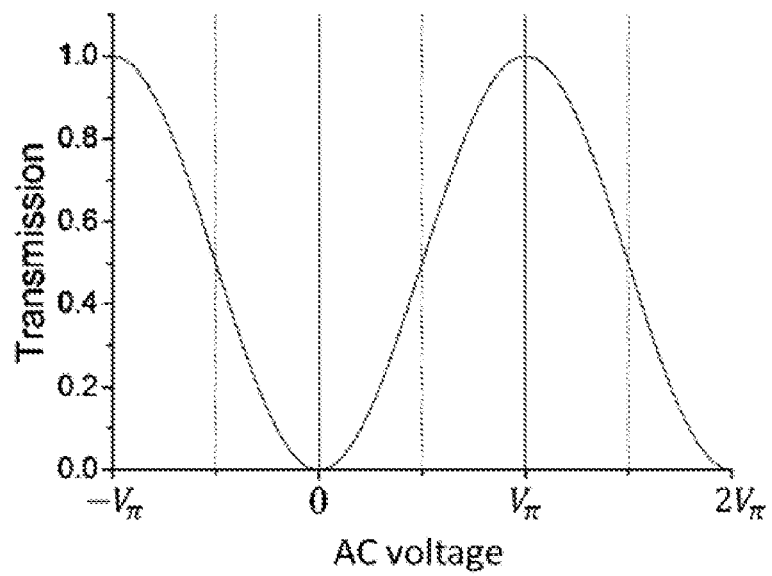

In Table 3 A=$A_0$ designates the transmittance level for states |0⟩ and |1⟩, which do not necessitate full transmittance e.g., voltage levels of about $V_\pi$, for example, $0.8V_\pi$ can be used, for which full transmittance of the input optical signal is achieved by the SD-EOM. FIG. 3B depicts the transmission response T∝|$E_{out}$|² of the SD-EOM i.e., the output amplitude from the SD-EOM. The optical phase output from the X-cut, or Z-cut, SD-EOM illustrated in FIG. 3A is shown in the graph plot of FIG. 3C. The driver unit 17u is configured to generate the biasing (DC on electrode 17b) signal, and the modulating (AC on electrode 17m) signal according to Table 2 for encoding the quantum states presented in Table 3.

Particularly, in this specific and non-limiting example the |0⟩ quantum state is encoded by transmitting a first light pulse modulated at time frame t=0 for full $A_0$ amplitude transmittance and no phase shift, by configuring the driver unit 17u to apply the $V_\pi$ voltage level over the modulating AC electrode 17m of the SD-EOM at the t=0 time frame, followed by V=0 light pulse modulation (i.e., no photons output) at time frame t=τ for zero amplitude transmittance, by configuring the driver unit 17u to apply '0' (zero) voltage level over the modulating AC electrode 17m of the SD-EOM at the t=τ time frame.

The |1⟩ quantum state is encoded by a first optical pulse modulated at time frame t=0 for zero amplitude transmittance, thus not requiring phase modulation (since there is no amplitude), by configuring the driver unit 17u to apply the '0' (zero) voltage level over the modulating AC electrode 17m of the SD-EOM at the t=0 time frame, followed by a second optical pulse modulated at time frame t=τ for the full $A_0$ amplitude transmittance and no phase shift, by configuring the driver unit 17u to apply a voltage level of about $V_\pi$ over the modulating AC electrode 17m of the SD-EOM at the t=τ time frame i.e., the |0⟩ and |1⟩ quantum states are encoded only by amplitude modulation and without phase modulation. In this example, the phase of the |0⟩ and |1⟩ quantum state is insignificant, because the encoding is determined only by the phase between t=0 and t=τ of the superposition states.

The |p⟩ quantum state is encoded in this non-limiting example by transmitting first and second optical pulses respectively modulated at time frames t=0 and t=τ for half ($A_0/2$) amplitude transmittance and no phase shift, by configuring the driver unit 17u to apply the a voltage level of about $V_\pi/2$ over the modulating AC electrode 17m of the SD-EOM at both of the t=0 and t=τ time frames i.e., the |p⟩ quantum state is encoded by transmittance of two consecutive optical pulses having the same ($A_0/2$) amplitude and no phase shift between them.

The |m⟩ quantum state is encoded by a first optical pulse modulated at time frame t=0 for half ($A_0/2$) amplitude transmittance and no phase shift, by configuring the driver unit 17u to apply a voltage level of about $V_\pi/2$ over the modulating AC electrode 17m of the SD-EOM at the t=0 time frame, followed by a second optical pulse modulated at time frame t=τ for half ($A_0/2$) amplitude transmittance and π phase shift, by configuring the driver unit 17*u* to apply the $-V_\pi/2$ voltage level over the modulating AC electrode 17*m* of the SD-EOM at the t=τ time frame i.e., the |m⟩ quantum state is encoded by transmittance of two consecutive optical pulses having the same ($A_0/2$) amplitude and a π phase shift between them.

FIG. 3A schematically illustrates a quantum transmitter system 40 according to other possible embodiments using a single-drive 'X-cut' or 'Z-cut' EOM 41 for qubit encoding of the quantum 0/1 and p/m bases. As seen, the transmitter system 40 of FIG. 4 differs from the transmitter system 20 of FIG. 2A by the use of the single-drive 'X-cut' or 'Z-cut' EOM 41 in the transmitter system 40. As also seen, the single-drive 'X-cut' or 'Z-cut' EOM 41 have biasing (41*b*) and modulating (41*m*) electrodes on both of the 'a' and 'b' waveguide arms, wherein the voltage level applied on the biasing electrode 41*b* of the 'b' arm is an internal inversion (10*v*) of the voltage level applied on the biasing electrode 41*b* of the 'a' arm, and the voltage level applied on the modulating electrode 41*m* of the 'b' arm is an internal inversion (10*v*) of the voltage level applied on the modulating electrode 41*m* of the 'a' arm. The X-cut, or Z-cut single-drive intensity modulator has electrodes on both of its waveguiding arms, and the ability to apply over each of the electrodes in one waveguide arm an inversion of the voltage level applied on the respective electrode in the other waveguide arm (e.g., such as manufactured by IXBlue, Fujitsu, Sumitomo).

Embodiments complying with the transmitter system 40 configuration of FIG. 3A, can use two phase values, one for a positive signal and one for a negative signal, with a π phase difference between them, for the qubit time-bin encoding. The voltage levels used to encode the qubits in such embodiments are presented in Table 4 below. To maintain an equal photon probability for the 0/1 and p/m quantum states, each one of the two pulses of the p/m basis have half the intensity of the 0/1 single pulse. The optimal voltage value is $V_\pi$, as it has the highest contrast but other voltage levels, positive or negative can be similarly used to generate the qubits using this scheme.

Figure 3C:
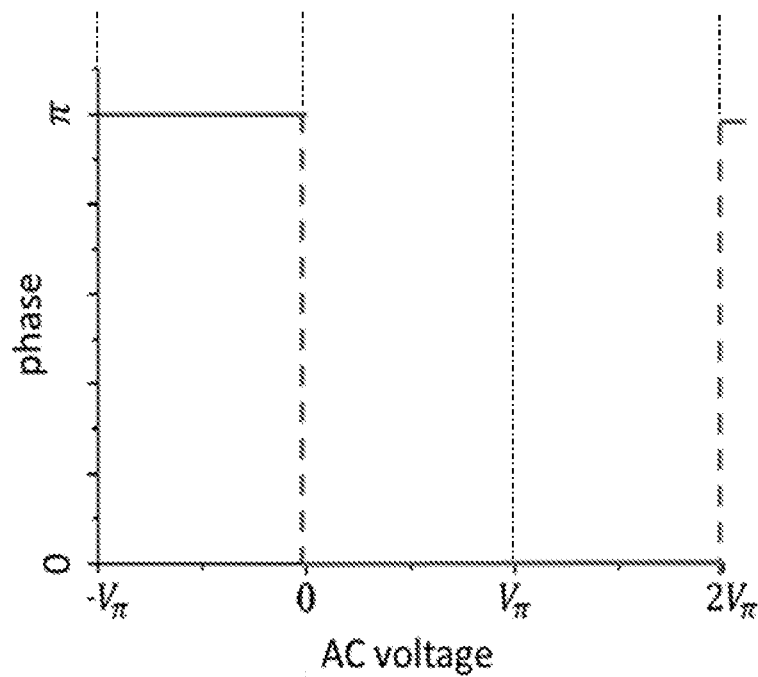

TABLE 4 quantum phases for generating four BB84 (or SARG) time-bin quantum states using X-cut, or Z-cut, SD-EOM 41 of FIG. 3A (the phase depends only on the polarity of the voltage, but not on the amplitude, as seen in FIG. 3C).

|  | t = 0 | t = τ |
|---|---|---|
| \|0⟩ | $V_\pi$ (A = $A_0$, φ = 0) | $V_0$ (A = 0, φ = 0) |
| \|1⟩ | $V_0$ (A = 0, φ = 0) | $V_\pi$ (A = $A_0$, φ = 0) |
| \|p⟩ | $V_\pi/2$ (A = $A_0/2$, φ = 0) | $V_\pi/2$ (A = $A_0/2$, φ = 0) |
| \|m⟩ | $V_\pi/2$ (A = $A_0/2$, φ = 0) | $-V_\pi/2$ (A = $A_0/2$, φ = −π) |

In all embodiments disclosed herein further improvements in the contrast of the transmitted qubits, such as pulse shaping and phase randomization, can be achieved by modulation of the optical signals (directly or indirectly) before, or after, they are passed through SD-EOM.

In possible embodiments different average photon probability per optical pulse, as required for decoy states QKD protocols, can be added by setting the quantum states using a lower voltage level.

Figure 1C:
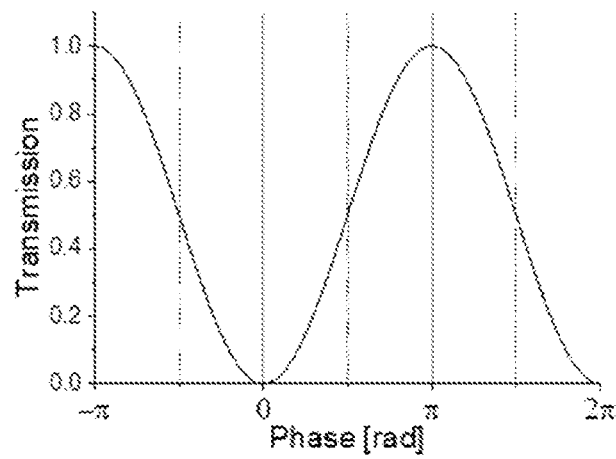

It should be noted that the use of the X-cut, or Z-cut, SD-EOM having the "step function" phase to voltage/transmittance relation, as shown in FIG. 3C, enables the creation of decoy states of different amplitudes but with identical phase to the main (and superposition) quantum states. On the other hand, in a modulator device having a sinusoidal phase to voltage/transmittance relation, as shown in FIG. 1C, this would not be achievable, as any other amplitude would have a different phase as well.

FIG. 4 is a block diagram schematically illustrating a portion of a QKD transmitter system 50 using an SD-EOM 17 according to some possible embodiments. The transmitter system comprises a laser light source (e.g., a CW laser diode) 55, a laser driver unit 52 electrically coupled to the laser light source 55, a SD-EOM 17 optically coupled to the laser light source 55, modulator driver unit 53 and bias control unit 54 electrically coupled to the SD-EOM 17, an attenuator unit 58 optically coupled to the SD-EOM 17, a quantum communication channel 59 (e.g., optical fiber or free-space medium) optically coupled to the attenuator unit 58 for transmitting the optical signals from the attenuator unit 58 to the receiver Rx, and a control unit 51 for orchestrating the operation of the system 50.

The laser drive unit 52 is configured to generate electrical driving voltages/currents 52*d* for operating the laser light source 55 according to control signals 52*c* generated by the control unit 51. The modulator driver unit 53 is configured to generate electrical modulation voltages 53*d* applied to the AC modulating electrode (not shown) of the SD-EOM 17 according to control signals 53*c* generated by the control unit 51. The bias control unit 54 is configured to generate electrical (DC) biasing voltages 54*d* applied to the biasing electrode (not shown) of the SD-EOM 17 according to control signals 54*c* generated by the control unit 51. Optionally, but in some embodiments preferably, the operation of the attenuator unit 58 is regulated by control signals 58*c* generated by the control unit 51.

A power meter unit 57 optically coupled to the output waveguide of the SD-EOM 17 is used in some embodiment to establish a closed feedback loop, by measuring the power of the optical pulse signals generated by the SD-EOM 17, and generating measurement data/signals 57*s* indicative thereof for generation of at least one of the control signals 52*c*, and/or 53*c*, and/or 54*c*, and/or 58*c*, according, by the control unit 51 for the operation of the system 50.

The control unit 51 comprises in some embodiments one or more processing units 51*u* and memories 51*m*, and a laser feedback control module 51*f* configured and operable to at least partially adapt the control signals 52*c* used for operating the laser driver 52 according to measurement data/signals 57*s* received from the power meter unit 57. The control unit 51 further comprises a four (4) states generator module 51*g* configured and operable for generating the control signals 53*c* used for operating the modulator driver unit 53 for the phase/amplitude modulation and qubits time-bin encoding by the SD-EOM 17 (e.g., according to Tables 2 to 5). A random number generator (RNG) module 51*r* can be also implemented in the control unit 51, as required for the QKD protocol. In possible embodiments the control unit 51 includes a post processing module 51*p* configured and operable for performing the communication and calculations required for completing the QKD procedure.

The control unit 51 can further include a communication module 51*x* configured and operable for data/signals communication with the receiver Rx over a standard/conventional (e.g., fiber optic, coaxial cables, LAN/MAN/WAN Ethernet, RF/cellular/satellite) data/signal communication channel 77, for carrying out the QKD protocol. The receiver Rx can be implemented utilizing any suitable conventional quantum receiver equipment.

Figure 6:
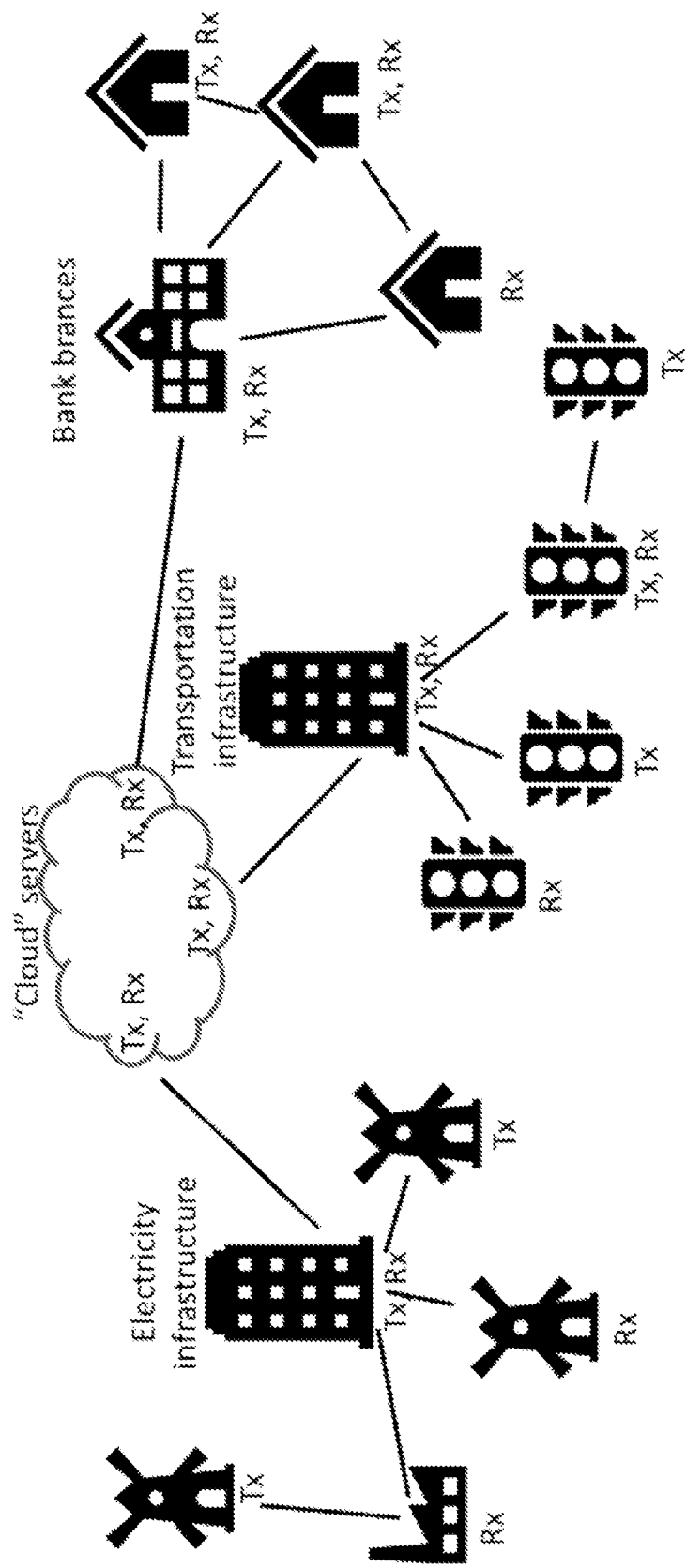
FIG. 6 schematically illustrates a communication network according to some possible embodiments.

The transmitter system 50 can be configured to communicate with the receiver system Rx for generating the cryptographic keys according to the QKD protocol used, and supply cryptographic keys to other transmitter and receiver systems for data encryption/decryption and/or for authentication, as exemplified in FIG. 6. For example, the transmitter system 50 can be configured to communicate with other receiver and/or transmitter systems, and/or with other network components, such as key servers, and/or directly with other key distribution services, and supply cryptographic keys and authentication.

In some embodiments the four (4) state generator module 51g that generates the modulating AC signals driving the SD-EOM 17 is implemented by summing two electric data signals of opposite signs. For example, using two synchronized transceivers with differential output e.g., from the same FPGA (field programmable gate array), as exemplified in FIG. 5A.

In this non-limiting example signals generated by a first transceiver of the synchronized transceivers unit 63 are taken from the positive Signal+ data signal output, and the signals generated by a second transceiver of the synchronized transceivers unit 63 are taken from the Signal− negative data signal output. One of the signals outputted from the synchronized transceivers unit 63 is attenuated to half (½) of the outputted power by the internal attenuator unit 61 (or voltage adjustment unit e.g., signal regenerator with tuneable amplitude or an amplifier configured for 50% signal attenuation). The exact attenuation value can be calibrated to compensate for amplifiers gain and RF line loss. For optimal overlap between the signals a tuneable delay unit 66 can be used on the other signals outputted from synchronized transceivers unit 63. The tuneable delay unit 66 can be implemented within the FPGA of the synchronized transceivers unit 63, by controlling the RF waveguide or by an external delay unit.

The delayed signals from the tuneable delay unit 66 and from the internal attenuator (or voltage adjustment unit) 61 (e.g., signal regenerator with tuneable amplitude or an amplifier) are combined (summated) by the combiner unit 67, which is thereby used to control the modulating signal applied by the modulator driver 53 over the modulating electrode (not shown) of the SD-EOM 17, for the qubit generation, as presented in Table 5 below.

TABLE 5

4-state generator voltage levels and timing usable in the configuration of FIG. 5.

| State | Positive signal $t = 0$ | Positive signal $t = \tau$ | Negative signal $t = 0$ | Negative signal $t = \tau$ |
|---|---|---|---|---|
| $|0\rangle$ | $V_\pi$ | 0 | 0 | 0 |
| $|1\rangle$ | 0 | $V_\pi$ | 0 | 0 |
| $|p\rangle = \frac{1}{\sqrt{2}}(|0\rangle + |1\rangle)$ | $V_\pi$ | $V_\pi$ | $-V_\pi/2$ | $-V_\pi/2$ |
| $|m\rangle = \frac{1}{\sqrt{2}}(|0\rangle - |1\rangle)$ | $V_\pi$ | 0 | $-V_\pi/2$ | $-V_\pi/2$ |

In order to add additional states as required for decoy states in possible embodiments, additional transceivers can be added and combined to implement suitable combinations to generate the required additional decoy levels e.g., for protection from photon number splitting attacks. Adding more synchronized transceivers with different voltage levels enables getting the same states but with a different average photon number per pulse, as required for decoy states.

FIG. 5B is a block diagram exemplifying use of three (3) synchronized transceivers 5a, 5b and 5c, of the synchronized (e.g., FPGA) transceivers unit 63 for generation of the modulation signals applied over the modulating electrode of the SD-EOM 17. The polarity of the data signals synchronized transceivers 5a, 5b and 5c, can be set as shown in FIG. 5B. The data signal produced by the synchronized transceiver 5b is attenuated (e.g., 50%) by the internal attenuator 61, and thereafter combined by a first combiner unit 67a with the data signal produced by the synchronized transceiver 5a, which is of opposite polarity. The combined signal produced by the first combiner unit 67a is then combined by a second combiner unit 67b with the data signal produced by the synchronized transceiver 5c, having the same polarity as that of the data signal produced by the synchronized transceiver 5b. The combined signal from the second combiner unit 67b is then used by the modulator driver 53 to control the modulating (AC) signal thereby applied over the modulating electrode of the SD-EOM 17.

The transmitter system shown in FIG. 5B can be configured to implement quantum states presented in Table 5, and it is also usable for generating additional decoy levels e.g., for QKD attacks protection.

Consistent with the present disclosure, each node of the QKD secured network may have a transmitter and/or a receiver. An example for such network is schematically illustrated in FIG. 6, which illustrates a QKD network configurations according to some possible embodiments. Optionally, some of the network nodes can have both a transmitter system (Tx) and a receiver system (Rx), and some of the network nodes can have only one of these systems. Cryptographic keys can be shared between all of the network nodes in the network. FIG. 6 shows some of the possible network configurations, for infrastructures such as electricity and transportation and for financial institutions.

The present disclosure describes various optical fiber-based transmitter system embodiments. It is however noted that the communication can be carried out either over optical fibers, or over free space medium (e.g., using free-space optics—FSO), including satellite communication, where size and weight are critical. In possible embodiments, the transmitter system according to any of the embodiments disclose herein can be combined with a suitable receiver system into the standard communication equipment designed for secure key sharing using a QKD protocol, such as, the BB84 (or SARG) protocol.

It should also be understood that throughout this disclosure, where a process or method is shown or described, the steps of the method may be performed in any order or simultaneously, unless it is clear from the context that one step depends on another being performed first. It is also noted that terms such as first, second, . . . etc. may be used to refer to specific elements disclosed herein without limiting, but rather to distinguish between the disclosed elements.

As described hereinabove and shown in the associated figures, the present invention provides quantum transmitter configuration suitable for QKD protocol implementations, and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A quantum-communication transmitter system comprising:
   a light source configured to generate coherent light;
   a Mach-Zehnder modulator optically coupled to said light source and configured to simultaneously modulate phase and amplitude of the coherent light generated by said light source; and
   a driving unit electrically coupled to said Mach-Zehnder modulator and configured to apply electric modulating voltage signals to one single modulating input driving said Mach-Zehnder modulator, to thereby cause said Mach-Zehnder modulator to generate phase and amplitude modulated coherent light pulses for implementing a four quantum states time-bin encoding scheme for qubits transmission over a quantum communication channel.

2. The system of claim 1 comprising an attenuator unit configured to attenuate the phase and amplitude modulated coherent light pulses generated by the Mach-Zehnder modulator before the transmission over the quantum communication channel.

3. The system of claim 1 wherein the driving unit is further configured to apply electric biasing voltage signals to other one single input of the Mach-Zehnder modulator.

4. The system of claim 1 wherein the driving unit is configured to generate the electric modulating voltage signals from first and second data signals received from respective first and second transceiver units, wherein polarity of one of said data signals is opposite to polarity of the other data signal.

5. The system of claim 4 wherein the driving unit comprises: at least one voltage adjustment unit configured to adjust voltage of at least one of said first or second data signals to attain an amplitude ratio therebetween for encoding the time-bin quantum states; a combiner unit configured to combine the data signals having the attained amplitude ratio therebetween; and a driving unit configured to control the electric modulating voltage signals applied over the modulating electrode based on the combined signal from said combiner unit.

6. The system of claim 5 further comprising at least one signal synchronizing element for synchronizing the first and second data signals in time.

7. The system of claim 1 wherein the driving unit is configured to generate the electric modulating voltage signals from first, second and third, data signals received from respective first, second and third, transceiver units, wherein polarity of the first data signal is opposite to the polarity of the other data signals.

8. The system of claim 7 wherein the driving unit comprises: at least one voltage adjustment unit configured to adjust voltage level of at least one of the first, second or third, data signals to attain an amplitude ratio therebetween for encoding the time-bin quantum states; at least one combiner unit configured to combine the time synchronized data signals having the attained amplitude ratio therebetween; and a driving unit configured to control the electric modulating voltage signals applied over the modulating electrode based on the combined signal from said at least one combiner unit.

9. The system of claim 8 further comprising at least one signal synchronizing element for synchronizing the first, second and third, data signals in time.

10. The system of claim 1 wherein the Mach-Zehnder modulator is a single drive modulator.

11. The system of claim 1 wherein the Mach-Zehnder modulator is a type of X-cut or Z-cut single drive modulator.

12. The system of claim 10 wherein the four quantum states of the time-bin encoding scheme utilizes either 0/1 and p/m, or 0/1 and r/l, or p/m and r/l, as its quantum state bases.

13. The system of claim 1 wherein the driving unit is configured to encode at least one of the quantum states of the time-bin encoding scheme by amplitude and phase modulation of two consecutive coherent light pulses.

14. The system of claim 1 comprising a control unit configured to operate components of said system for carrying out a QKD protocol.

15. The system of claim 14 wherein the QKD protocol is either BB84, or SARG, or a derivative of any of these protocols.

16. The system of claim 14 wherein the control unit is configured to generate control signals for operating at least one of the light source, the Mach-Zehnder modulator, and the attenuator unit.

17. The system of claim 16 comprising a power meter unit optically coupled to an output of the Mach-Zehnder modulator and configured to measure power of the modulated coherent light pulses thereby generated, and generate measurement data indicative thereof, and wherein the control unit is configured to generate the control signal at least partially based on measurements generated by said power meter.

18. The system of claim 1 wherein the driving unit is configured to cause the Mach-Zehnder modulator to generate the quantum states with different voltage levels as QKD decoy states.

19. A quantum-communication transmission method comprising:
   generating coherent light; and
   simultaneously modulating phase and amplitude of said coherent light by applying electric modulating voltage signals to one single modulating input of a Mach-Zehnder modulator, to thereby cause said Mach-Zehnder modulator to generate phase and amplitude modulated coherent light pulses for implementing a four quantum states time-bin encoding scheme for qubits transmission over a quantum communication channel.

20. The method of claim 19 comprising attenuating the phase and amplitude modulated coherent light pulses generated by the Mach-Zehnder modulator before the transmission over the quantum communication channel.

21. The method of claim 19 further comprising applying electric biasing voltage signals to other one single input of the Mach-Zehnder modulator.

22. The method of claim 19 comprising generating the electric modulating voltage signals from first and second data signals, wherein one of said data signals is an inverse of the other data signal.

23. The method of claim 22 comprising adjusting voltage of at least one of said first and second data signals to attain an amplitude ratio therebetween for encoding the time-bin quantum states, combining the data signals at the attained amplitude ratio, and controlling the electric modulating voltage signals applied over the modulating electrode based on the combined signal obtained.

24. The method of claim 23 further comprising synchronizing in time the first and second data signals before or after the adjusting of their voltages.

25. The method of claim 19 comprising generating the electric modulating voltage signals from first, second and third, data signals, wherein polarity of the first data signal is opposite to the polarity of the other data signals.

26. The method of claim 22 comprising adjusting voltage of at least one of said first, second and third, data signals to attain an amplitude ratio therebetween for encoding the time-bin quantum states, combining the data signals at the attained amplitude ratio, and controlling the electric modulating voltage signals applied over the modulating electrode based on the combined signal.

27. The method of claim 26 further comprising synchronizing in time the first, second and third, data signals, before or after the adjusting of their voltages.

28. The method of claim 19 wherein the Mach-Zehnder modulator is a single drive modulator, or a type of X-cut or Z-cut single drive modulator.

29. The method of claim 19 wherein the implementing of the four quantum states time-bin encoding scheme comprises using p/m and r/l quantum state bases for the encoding.

30. The method of claim 19 comprising encoding at least one of the quantum states of the time-bin encoding scheme by amplitude and phase modulation of two consecutive coherent light pulses.

31. A method of carrying out a QKD protocol utilizing the quantum-communication transmission method of claim 19.

32. The method of claim 19 comprising measuring a power of the modulated coherent light pulses and generating measurement data indicative thereof, and controlling operation of the coherent light source at least partially based on the said measurement data.

* * * * *